(12) United States Patent
Das et al.

(10) Patent No.: US 11,501,013 B1
(45) Date of Patent: Nov. 15, 2022

(54) AUTONOMOUS MACHINE LEARNING METHODS FOR DETECTING AND THWARTING MALICIOUS DATABASE ACCESS

(71) Applicant: Sotero, Inc., Burlington, MA (US)

(72) Inventors: Purandar Gururaj Das, Lexington, MA (US); Shanthi Boppana, Boxborough, MA (US)

(73) Assignee: Sotero, Inc., Burlington, MA (US)

( * ) Notice: Subject to any disclaimer, the term of this patent is extended or adjusted under 35 U.S.C. 154(b) by 0 days.

(21) Appl. No.: 17/860,196

(22) Filed: Jul. 8, 2022

Related U.S. Application Data

(60) Provisional application No. 63/219,933, filed on Jul. 9, 2021.

(51) Int. Cl.
| | |
|---|---|
| *H04L 29/06* | (2006.01) |
| *G06F 21/62* | (2013.01) |
| *G06N 20/00* | (2019.01) |
| *G06F 21/56* | (2013.01) |

(52) U.S. Cl.
CPC ........ *G06F 21/6218* (2013.01); *G06F 21/566* (2013.01); *G06N 20/00* (2019.01); *G06F 2221/034* (2013.01)

(58) Field of Classification Search
CPC .... G06F 21/608; G06F 21/566; G06F 21/577; H04L 63/1433; H04L 63/1425; H04L 63/108
USPC .......................................................... 726/23
See application file for complete search history.

(56) References Cited

U.S. PATENT DOCUMENTS

| | | |
|---|---|---|
| 7,783,899 B2 | 8/2010 | Golle et al. |
| 7,783,900 B2 | 8/2010 | Hacigumus et al. |
| 7,890,774 B2 | 2/2011 | Agrawal et al. |
| 8,429,421 B2 | 4/2013 | Chase et al. |
| 9,047,480 B2 | 6/2015 | Kahol et al. |

(Continued)

FOREIGN PATENT DOCUMENTS

WO WO-2021178609 A1 9/2021

OTHER PUBLICATIONS

Anomaly Detection on Time-Evolving Streams in Real-time. Detecting intrusions (DoS and Ddos attachks), frauds, fake rating anomalies, retrieved on Aug. 8, 2022 at https://github.com/Stream-AD/Mstream (4 total pages).

(Continued)

*Primary Examiner* — Longbit Chai
(74) *Attorney, Agent, or Firm* — Cooley LLP

(57) ABSTRACT

An anomaly detection method includes receiving, at a processor, a request including a query that references a database. A plurality of attributes is identified based on the request. The processor concurrently processes the query to identify a result, and analyzes the plurality of attributes to identify an anomaly score. When the anomaly score exceeds a first predefined threshold, a signal representing a quarantine request is sent, and a signal representing the result is not sent. When the anomaly score is between the first predefined threshold and a second predefined threshold, a signal representing a notification and a signal representing the result are sent. When the anomaly score is below the second predefined threshold, a signal representing a quarantine request is sent, and a signal representing the result is not sent.

18 Claims, 5 Drawing Sheets

(56) References Cited

U.S. PATENT DOCUMENTS

| | | | |
|---|---|---|---|
| 9,712,495 B2 | 7/2017 | Nagpal et al. | |
| 9,805,090 B1 | 10/2017 | Martino et al. | |
| 9,875,370 B2 | 1/2018 | Antonopoulos et al. | |
| 10,013,574 B2 | 7/2018 | Hore | |
| 10,027,486 B2 | 7/2018 | Liu | |
| 10,255,454 B2 | 4/2019 | Kamara et al. | |
| 10,496,638 B2 | 12/2019 | Wang et al. | |
| 10,528,556 B1 | 1/2020 | Chmil et al. | |
| 10,581,812 B2 | 3/2020 | Rohloff et al. | |
| 10,885,158 B2 | 1/2021 | Goldwasser et al. | |
| 10,984,052 B2 | 4/2021 | Dong et al. | |
| 11,025,598 B1 | 6/2021 | Laghaeian et al. | |
| 11,038,672 B2 | 6/2021 | Shainski et al. | |
| 11,184,149 B2 | 11/2021 | Chakraborty et al. | |
| 11,222,134 B2 | 1/2022 | Das et al. | |
| 2002/0069355 A1 | 6/2002 | Garrison | |
| 2004/0193905 A1 | 9/2004 | Lirov et al. | |
| 2007/0195960 A1 | 8/2007 | Goldman et al. | |
| 2013/0191650 A1 | 7/2013 | Balakrishnan et al. | |
| 2014/0281512 A1 | 9/2014 | Arasu et al. | |
| 2014/0325217 A1 | 10/2014 | Mori et al. | |
| 2017/0063888 A1* | 3/2017 | Muddu | G06N 5/022 |
| 2017/0366568 A1* | 12/2017 | Narasimhan | G06F 16/958 |
| 2019/0108255 A1 | 4/2019 | Tabak et al. | |
| 2019/0147170 A1 | 5/2019 | Keselman et al. | |
| 2019/0258817 A1 | 8/2019 | Beier et al. | |
| 2020/0036512 A1 | 1/2020 | Vaikuntanathan et al. | |
| 2020/0151356 A1 | 5/2020 | Rohloff et al. | |
| 2020/0228308 A1 | 7/2020 | Shainski et al. | |
| 2021/0004373 A1 | 1/2021 | Sankaran et al. | |
| 2021/0157932 A1 | 5/2021 | Blatt et al. | |
| 2021/0160048 A1 | 5/2021 | Blatt et al. | |
| 2021/0273958 A1* | 9/2021 | McLean | G06N 20/20 |
| 2022/0207172 A1 | 6/2022 | Das et al. | |

OTHER PUBLICATIONS

Bhatia, S., et al., "MSTREAM: Fast Anomaly Detection in Multi-Apsect Streams," WWW'21: Proceedings of the Web Conference (Apr. 19, 2021) (12 total pages).

Curing, C. et al. "Relational Cloud: A Database-as-a-Service for the Cloud." 5th Biennial Conference on Innovative Data Systems Research, CIDR 2011, Jan. 9-12, 2011 Asilomar, California (7 total pages).

International Search Report and Written Opinion issued for International Application No. PCT/US2021/020779, dated May 3, 2021.

Popa, et al.,"CryptDB: Protecting Confidentiality with Encrypted Query Processing," SOSP '11, (Oct. 23-26, 2011), pp. 85-100.

Wen et al., "PaRQ: A Privacy-Preserving Range Query Scheme Over Encrypted Metering Data for Smart Grid,", IEEE, vol. 1, No. 1, pp. 178-191, doi: 10.1109/TETC.2013.2273889 (Jul. 2013).

Yang et al., "Privacy-Preserving Queries on Encrypted Data," https://www.semanticscholar.org/paper/Privacy-Preserving-Queries-on-Encrypted-Data-Yang-Zhong/684b24117bfa7a93010d386425faa917d9cf3e61 (2006) (17 total pages).

* cited by examiner

AUTONOMOUS MACHINE LEARNING METHODS FOR DETECTING AND THWARTING MALICIOUS DATABASE ACCESS

CROSS-REFERENCE TO RELATED APPLICATIONS

This application claims the benefit of, and priority to, U.S. Provisional Application No. 63/219,933, filed Jul. 9, 2021 and titled "Autonomous Machine Learning Methods for Detecting and Thwarting Malicious Database Access," the entire content of which is incorporated herein by reference for all purposes.

TECHNICAL FIELD

This disclosure relates generally to data security, and more specifically, to the detection and prevention of malicious attempts to access encrypted data in a datastore.

BACKGROUND

Data (particularly sensitive data) is more valuable than ever, for example since an increasing variety of data types are attractive to hackers (e.g., financial data, healthcare data, passwords, etc.). Encryption has emerged as an important tool in securing sensitive data and other assets. Several data protection and privacy standards, such as the General Data Protection Regulation (GDPR), now require encryption of the sensitive data.

SUMMARY

In some embodiments, an anomaly detection method includes receiving, at a processor, a request including a query that references a database. A plurality of attributes is identified based on the request. The processor concurrently processes the query to identify a result, and analyzes the plurality of attributes to identify an anomaly score. When the anomaly score exceeds a first predefined threshold, a signal representing a quarantine request is sent, and a signal representing the result is not sent. When the anomaly score is between the first predefined threshold and a second predefined threshold, a signal representing a notification and a signal representing the result are sent. When the anomaly score is below the second predefined threshold, a signal representing a quarantine request is sent, and a signal representing the result is not sent.

DETAILED DESCRIPTION

Figure 1:
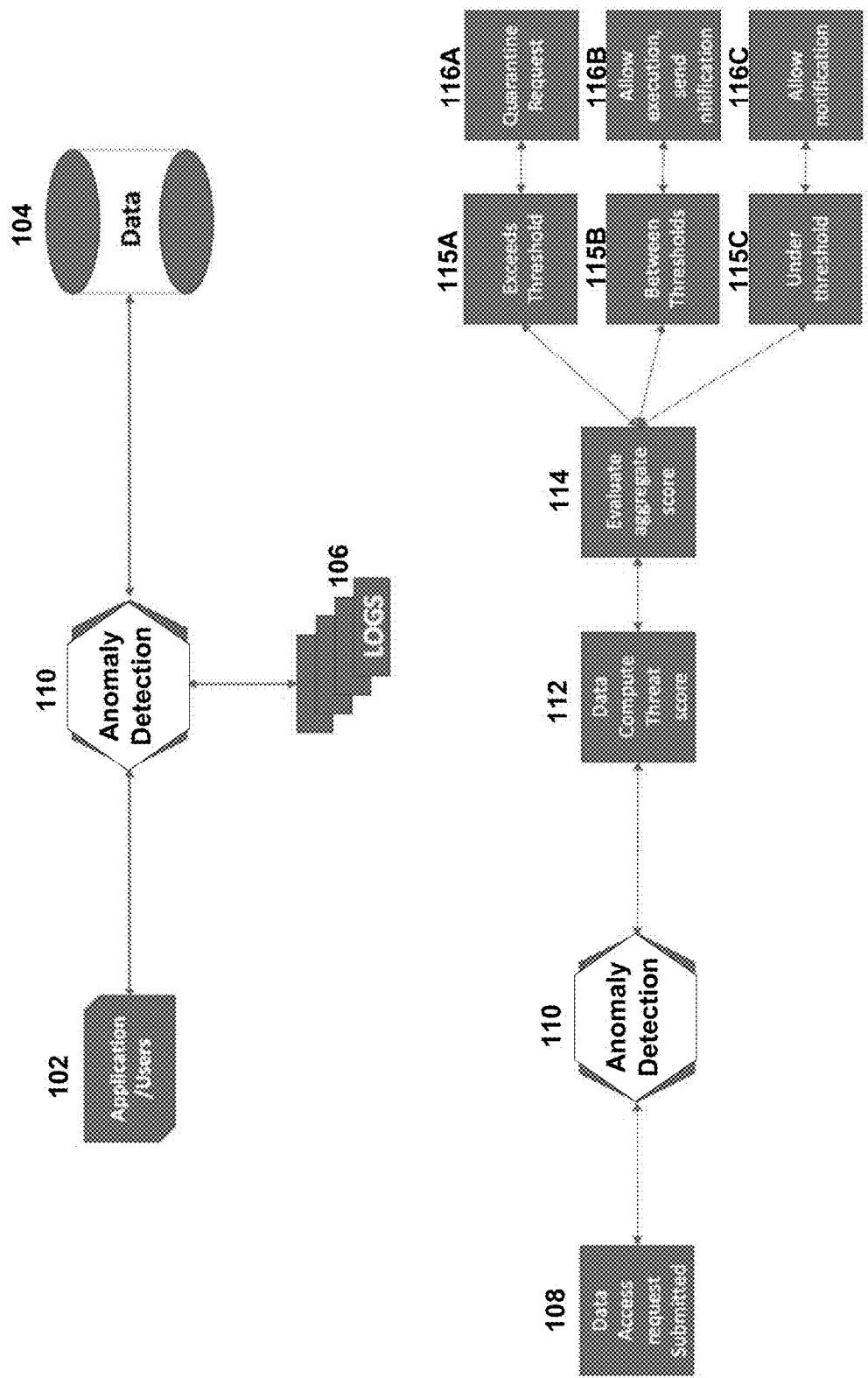
FIG. 1 shows example anomaly detection dataflows, according to some embodiments.

Systems and methods set forth herein facilitate the detection of anomalies within streaming (or "streamed") data, specifically at the data store (e.g., database) level, in real time.

Anomaly detection is the identification of items or events within a networked computing system that are rare, or that raise suspicion in that they differ significantly from a majority of the data processed by that networked computing system. There are at least three general categories of anomaly detection: unsupervised anomaly detection, supervised anomaly detection, and semi-supervised anomaly detection. During unsupervised anomaly detection (e.g., Random Cut Forests or Isolation Forests), anomalies are detected within an unlabeled dataset, typically under the assumption that most of the instances of data within the unlabeled dataset are "normal" (i.e., not anomalous). The anomalies can be detected by either training a model offline and applying one or more inferences, or using a streaming model that updates online. Supervised anomaly detection is typically performed on data sets whose data have been labeled as either "normal" and "abnormal," and includes training and deploying a classifier. Semi-supervised anomaly detection typically includes constructing a model that represents normal behavior, based on a known normal training data set, and subsequently testing the likelihood of a test instance to be generated by the trained model.

Unlike known approaches to anomaly detection, embodiments set forth herein can detect and stop potentially harmful access attempts in real time at the database (or datastore) level using a self-learning machine learning algorithm. In some embodiments, an anomaly detection system uses an online/streaming machine learning model and one or more application programming interfaces (APIs). The anomaly detection system can be configured to detect and, optionally, "tag" (i.e., store an association in memory), one or more of:

Rare Events on a Dataset Dimension
  For example, by identifying rare users and/or internet protocol (IP) addresses accessing the dataset
Rare Events on a User Dimension
  For example, by identifying rare SQL queries, IP addresses, and/or datasets along a temporal (time) dimension.
Rare Events on a Temporal Dimension
  For example, by identifying rare transaction rates (e.g., transactions per second), by user, by dataset, and/or by sensitive flag
Rare Event Connection Failures
  For example, by identifying connection failures by dataset and/or by user One or more anomaly detection embodiments of the present disclosure includes the capability to identify and subvert/stop potentially malicious data access attempts using a self-training (or self-learning) machine learning engine. For example, a request received at the anomaly detection system can be identified as potentially malicious based on an analysis of multiple factors associated with the request. The request may include a query. These factors may include one or more of: the user that submitted the request or from whom the request originated, the time of submission of the request, the date of submission of the request, the day of submission of the request, the location from which the request was transmitted (e.g., geographic location, internet protocol (IP) address, etc.), the specific data set that the request is attempting to access, etc. Any number of different factors or attributes may be used for this purpose, and the types of factors (or "attributes") that are included in a given set of factors or attributes may be predefined, for example by a user (such as a system administrator). The factors/attributes can include attributes that are part of the request. In some implementations, each attribute from a given set of attributes may be assigned a different associated weight such that the attributes contribute to differing degrees in the determination of maliciousness.

In some embodiments, an anomaly detection engine, implemented in software and/or hardware, is configured to automatically detect requests and/or analyze the requests (with their associated factors), in real time or substantially in real time, to identify potential deviations from one or more comparison values or sets of values, such as historical usage patterns. The anomaly detection engine can train itself autonomously, for example by collecting data over a predefined period of time and/or by processing historical transactions.

In some embodiments, an anomaly detection system is configured to actively perform actions that accomplish three distinct functions—prevention, detection, and protection. Prevention and/or detection actions can include inspecting transactions that are submitted to the database or datastore for execution. As used herein, the term "transaction" can refer to or include any of (without being limited to) a query, a read operation, a write operation, a create operation, a read operation, a delete operation, an update operation, or a combination thereof. Each submitted transaction, in addition to being logged, can be parsed into multiple different components. The components can then be evaluated, for example in the context of historical use of the data set (i.e., the data contained in the database). Each factor or attribute that is a part of the transaction can be assigned an anomaly score, and a combined threat score can be computed using weighted scores for all of the factors or attributes in the transaction. The combined threat score can be used to categorize transactions based on one or more score ranges and/or one or more rules. Such categorizations, or the score range(s) and/or the rules individually, can be used by the system to make decisions regarding the execution of the transaction. For example, based on the categorizations, score range(s), and/or the rules, a transaction may be denied, refused, deleted, executed, executed with a concurrent notification, or executed with a concurrent quarantining of the transaction for further review and subsequent approval/disapproval. In some implementations, the scoring, categorization and/or decision making of the anomaly detection system is based on a self-learning machine learning algorithm. Decisions may be stored to one or more memories (local and/or remote and network-accessible) of the anomaly detection system for later use, for example for use in updating or retraining of a self-learning machine learning algorithm.

In some embodiments, an anomaly detection system or engine is accessible by one or more users via one or more translation and encryption/decryption API. The anomaly detection system or engine can operate autonomously (e.g., without user input), and can function asynchronously.

In some embodiments, an anomaly detection method includes receiving an inbound request (e.g., including a query). The inbound request can be handled/processed by a driver wrapper of an API. As used herein, a driver wrapper refers to a subroutine in a software library that functions as an adapter between an operating system and a driver (e.g., a device driver) that was not designed for that operating system. The request is then submitted to a translation call, and the translated call is then compared to a baseline profile to identify anomalies. The transaction is logged (e.g., subsequently to, or concurrently with, the comparison), optionally with a status indicator (e.g., "pending"). A threat score is then generated and assigned to the request. The threat score can be determined based on one or more predefined thresholds, which may be associated specifically with a current software application, a referenced database, or a combination thereof. Based on the threat score, a decision is made to at least one of: submit the request (e.g., allow the query to be processed), process the request, submit the request with a concurrent notification, quarantine the request, deny the request, generate a notification that indicates an approval of the request, generate a notification that indicates a denial of the request, or trigger a behavior at a system that is remote from, but operably coupled to (e.g., in wireless network communication with) the anomaly detection system/engine. The decision can then be passed to the API, for example to submit the request or to return a message to a requestor indicating a transaction hold. In the event of a decision to quarantine the request, the decision and/or one or more metrics associated with the decision (e.g., that influenced the quarantine decision) can be sent to a management console or other compute device, for example to be displayed via a graphical user interface (GUI). In the event of a decision to submit the request, and upon successful execution of the request, a status may be updated and stored in memory, optionally with other metrics such as the data volume, the time of execution, the date of execution, an identifier of the requestor, an identifier of the referenced data, etc. As used herein, "metrics" can refer to (but are not limited to) any of the following: user ID, source of call (e.g., a software application identifier), a time of day, an application source (e.g., a web page or an API that issued the call), an IP address, a geographic location, an identifier of a target object, a SQL query, an amount of data that is being requested, a command type (e.g., is it a new SQP that is being issued?), or a number of queries or requests occurring within a given time window.

Baseline Profile Generation

In some embodiments, an anomaly detection system is configured to generate/define a baseline profile for one or more individual users. The baseline profile for a user can include representations of, and/or can be generated/defined based on, one or more of: a window of time during which the user is typically or actually active, application(s) that are typically used by the user, data objects typically targeted by the user for data retrieval or querying, types of queries that the user typically executes, a volume of data that is typically interacted with by the user, an IP address associated with the user, or a geographic location from which the user typically interacts with the anomaly detection system.

Alternatively or in addition, in some embodiments, an anomaly detection system is configured to generate/define a baseline profile for one or more software applications ("apps"). The baseline profile for an app can include representations of, and/or can be generated/defined based on, one or more of: users associated with the app, IP addresses associated with the app, queries associated with the app, data objects that are typically used or targeted by the app, number of requests (e.g., for one or more predefined time windows), or geographic locations associated with the app.

Alternatively or in addition, in some embodiments, an anomaly detection system is configured to generate/define a baseline profile for one or more target data objects. The baseline profile for a target data object can include representations of, and/or can be generated/defined based on, one or more of: valid historical requests, requests that are forbidden, requests that are infrequently used, requests that are frequently used, mass download requests, or mass encryption requests.

In some embodiments, the anomaly detection system is configured to operate with minimal latency (e.g., due to processing overhead). In some such implementations, latency is substantially limited to the latency incurred during mapping and query translation. Mapping refers to the identification of attributes within a request (e.g., encrypted and/or unencrypted attributes) and translating them to refer to the encrypted versions of the attributes.

In some embodiments, the anomaly detection system includes a transaction repository that stores "raw transactions" (e.g., as received at the anomaly detection system, optionally in unstructured format). The datastore of the anomaly detection system may accumulate and store database related transaction information, as well as transactional logs, optionally including transactional logs received from an external source (e.g., received via a telecommunications network from a remote compute device). Examples of transactional logs include firewall logs, Web server logs, & application logs.

In some embodiments, the anomaly detection system includes a management console that provides access for administrative functions and/or viewing of information related to the database activity. The management console can be implemented in hardware and/or software, and can include a user-navigable GUI (e.g., displayed via a display of the user) with interactive fields. Summarized information related to current activity can be displayed via the management console, for example in summarized graphical form. The summarized information can include information such as total transactions, transaction by threat score range, flagged transactions, quarantined transactions. This would need to be an auto refreshing page with up to date information. The ability to filter by database or by application in a multi-tenant scenario is also required. Alternatively or in addition, the anomaly detection system can include a review interface for displaying transactions awaiting review and approval. The review interface can be implemented in hardware and/or software, and can include a user-navigable GUI (e.g., displayed via the display of the user) with interactive fields. An administrator may review and either approve or decline transactions via the review interface. Approving or declining transactions can be performed, for example, by interacting with the GUI. When a transaction is declined, a decline message may be automatically generated and sent to the requestor, the decline message including an indication that the transaction/request has been declined. When a transaction is approved, an approval message may be automatically generated and sent to the requestor, the approval message including an indication that the transaction/request has been approved, and the request may be processed (e.g., the query or other transaction may be submitted for execution). When transactions are declined and approved, data associated with the transactions and the associated approve/decline decisions may be stored in a transaction repository of the memory of the anomaly detection system.

In some embodiments, the anomaly detection system is configured to detect one of more of the following conditions: SQL overflow, SQL injection, anomalous location, anomalous time of day or date, anomalous volume of data, anomalous frequency of access associated with a particular user, anomalous frequency of access associated with a particular datastore, anomalous frequency of access associated with a particular data set, anomaly in data set being accessed, anomalous application or application behavior, newly-identified anomaly (i.e., an anomaly that was not previously defined or known by the anomaly detection system), anomalous device identifier, anomalous browser identifier, anomalous operation system (OS), and data dump. In response to detecting one or more of the foregoing conditions, the anomaly detection system can be configured (e.g., via software) to automatically perform one or more of: generate an alert message, send an alert message, cause an alert message to be displayed, cause details about the requested transaction to be displayed, block the transaction from proceeding, generate a decline message, send a decline message to a requestor, generate a hold message, cause the transaction to be held for further analysis, etc. In some implementations, the anomaly detection system includes one or more predefined control thresholds. Alternatively or in addition, in some implementations, the anomaly detection system includes a "whitelist" or list of approved users, IP addresses, request types, requestor compute devices, etc. Alternatively or in addition, in some implementations, the anomaly detection system can be configured to detect an anomaly based on an IP address of a requestor, a geolocation of the requestor a detected "role" (e.g., permissioning) of the requestor, and/or a predefined data transfer limit.

Data Exchanges to the Transaction Repository

In some embodiments, the anomaly detection system is configured to ingest (e.g., receive) requests and/or transactional logs and perform data extraction (e.g., to identify attributes of the requests) via one or more APIs. The APIs can be configured to perform the extraction of data in either transactional time (real time) or in periodic scheduled batches. The transaction repository can also be fed with transactional log information from one or more external sources via the APIs.

FIG. 1 shows example anomaly detection dataflows, according to some embodiments. The upper portion of FIG. 1 shows an anomaly detection system 110 (implemented in software and/or hardware), accessible by one or more software applications and/or users 102 (e.g., via wired or wireless network communication with the anomaly detection system 110), and operably coupled to one or more sources of data 104 and one or more sources of transactional logs 106. The lower portion of FIG. 1 shows the anomaly detection system 110 in the context of an example data flow in which a data access request 108 is submitted (e.g., via a compute device of a requesting user ("requestor")) to the anomaly detection system 110, and the anomaly detection system 110 computes a threat score at 112 based on the data access request 108 (e.g., by first identifying attributes of the data access request 108, as discussed further below, optionally using a self-learning machine learning algorithm). An aggregate score is then generated, at 114, by the anomaly detection system 110 based on the threat scores computed at 112. A determination is then made as to whether the aggregate score exceeds a first predefined threshold (115A), falls between the first predefined threshold and a second predefined threshold (115B), or falls below the second predefined threshold (115C). When the aggregate score is found to exceed the first predefined threshold (115A), a quarantine request is generated at 116A. When the aggregate score is found to fall between the first predefined threshold and the second predefined threshold (115B), execution of the data access request is permitted, and a notification is generated and sent (e.g., to a compute device of an administrator and/or to the compute device of the requestor) at 116B. When the aggregate score is found to fall below the second predefined threshold (115B), a notification that the data access request is "allowed" is generated and sent (e.g., to a compute device of an administrator and/or to the compute device of the requestor) at 116C. Alternatively or in addition, at 116C, execution of the data access request may be permitted.

In some embodiments, an anomaly detection system preventing data theft by shielding data during operation ("in use"). For example, the anomaly detection system can perform real time streaming detection of anomalous transactions in a time series data stream. Transactions (or transaction requests) received at the anomaly detection system can include queries. In some such implementations, each query transaction can have one or more of the following attributes: a dataset identifier, a user identifier, a SQL instruction to be executed, an IP address associated with the query (e.g., with the requestor), a timestamp, an "is sensitive" flag (indicating whether the SQL includes any sensitive/secure elements), and a transaction type identifier of "query." A DB Connect function of the anomaly detection system, implemented in software and/or hardware, can include communication between the database and one or more external processes, the ability to pass instructions to the database, the ability to pass data to the data set, and the ability to retrieve/receive data from the data set. The instructions can include data retrieval instructions, instructions pertaining to the retrieval of data filters, instructions to modify/change the data set, and instructions to delete some or all of the data set. The DB Connect function can also function to authenticate a process and/or a user that is submitting a request. Upon receipt of a query or other transaction, the DB Connect function can generate a transactional log with one or more of the following attributes: the dataset identifier, the user identifier, a transaction status, a timestamp, and a type identifier of "connect." The anomaly detection system can be configured to detect one or more anomalies based on the transaction/transaction request. The one or more anomalies can include one or more of: rare events based on the referenced/target dataset, rare users, rare internet protocol (IP) addresses, rare events based on the user requesting the transaction, rare SQL, rare dataset(s) being referenced, time of day, day of the week, variation in metrics (or rate(s) thereof) during a predefined time period, number of transactions per second per user, number of transactions per second per dataset, number of transactions per second per sensitive flag, presence of connection failure(s), frequency of connection failure(s), connection failure(s) by dataset, and/or connection failure(s) by user.

In some embodiments, an anomaly detection system is programmed (e.g., via a software instruction "/configure") to configure attributes of a particular data stream (e.g., an incoming data stream). For example, the anomaly detection system may configure attributes of an incoming data stream to encrypt 'plain text' values within the data set. Alternatively or in addition, the anomaly detection system may manipulate 'labels' describing the attributes of a data stream to refer to the encrypted versions of the attributes. The anomaly detection system is also programmed (e.g., via a software instruction "/detect") to receive a message representing a transaction and compute an anomaly score based on the transaction and, optionally, based on data associated with one or more historical transactions. The computation of the anomaly score can be performed within 5 milliseconds (ms), or within 4 ms, or within 3 ms, or within 2 ms. In some implementations, the anomaly detection system is programmed to compute anomaly scores for thousands of transactions per second (e.g., between about 1,000 and about 5,000 transactions per second). Once the anomaly detection system has computed the anomaly scores, the anomaly detection system may automatically reset and reload the transaction history (e.g., now updated to include any newly-processed transactions).

Figure 2:
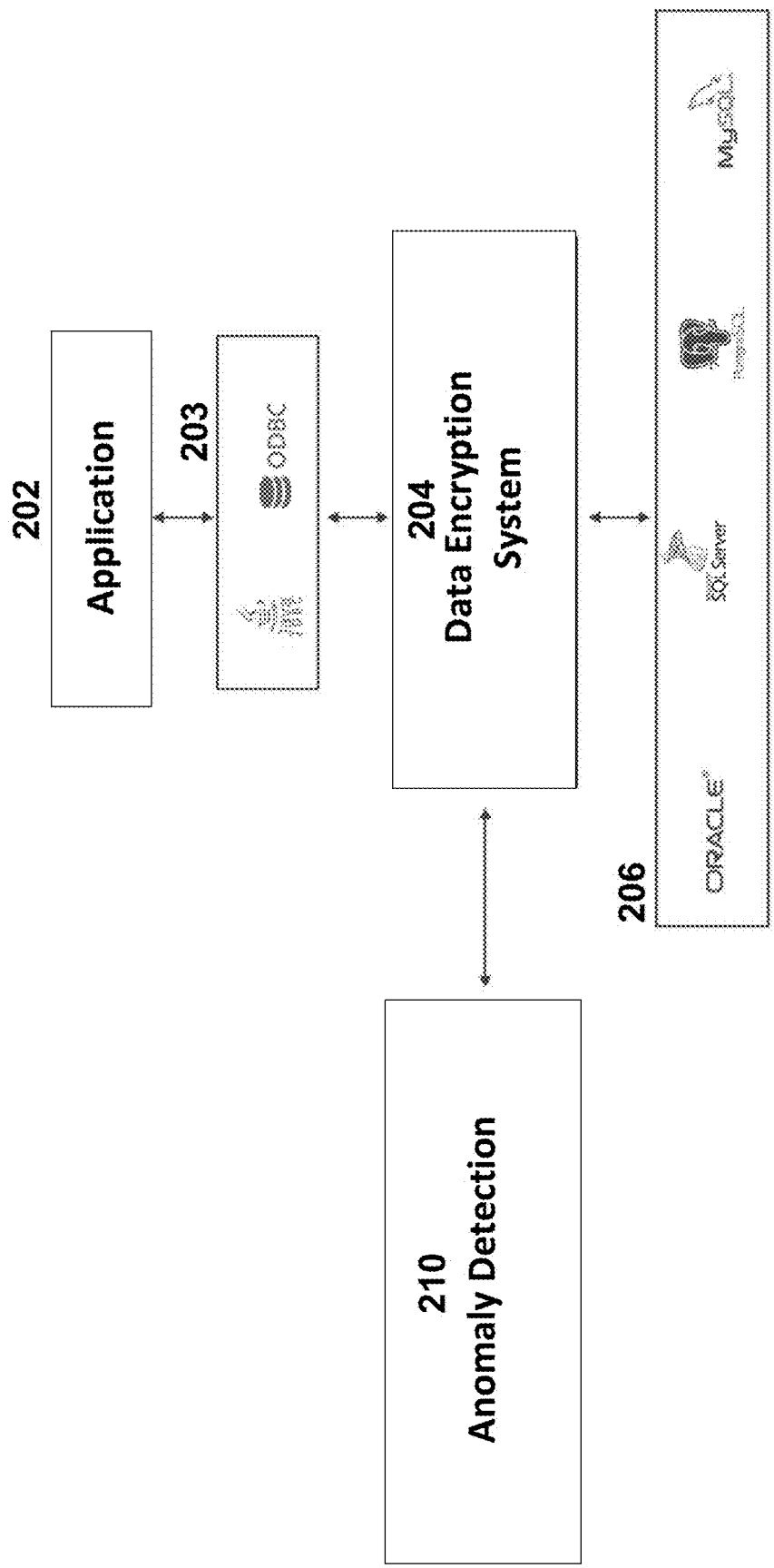
FIG. 2 is a diagram of an example anomaly detection system, according to some embodiments.

FIG. 2 is a diagram of an example anomaly detection system, according to some embodiments. As shown in FIG. 2, the anomaly detection system includes a data encryption system 204, which may include an encrypted database, and which is operably coupled to an anomaly detection system 210 (e.g., similar to the anomaly detection system 110 of FIG. 1) such that the data encryption system 204 and the anomaly detection system 210 can communicate with one another (e.g., via a wired or wireless communications network). Optionally, the data encryption system 204 and the anomaly detection system 210 can be co-located within a common compute device. The data encryption system 204 can receive requests from a software application 202 via an API 203 (e.g., Open Database Connectivity (ODBC)), and can receive data (e.g., transactional logs) from one or more remote data sources 206, which can include servers and other compute devices. The data encryption system 204 can be in communication with the software application 202 and/or the remote data sources 206 via a wired or wireless communications network.

In some embodiments, an anomaly detection system is adaptive and is programmed to learn (e.g., via machine learning) based on one or more detected "false starts." Alternatively or in addition, the anomaly detection system can be programmed to detect seasonality across a set of transactions, and store a representation of the seasonality in memory for optional use in future anomaly detection events and/or for retraining of the machine learning model. Alternatively or in addition, the anomaly detection system can include one or more machine learning algorithms that are automatically retrained, either continuously or according to a predefined schedule.

In some embodiments, an anomaly detection system is configured to detect anomalies in a series or sequence of multiple events.

In some embodiments, an anomaly detection system is configured to provide datatype support for variables such as character, varchar, Int, BigInt, TinyInt, number, date, and timestamp. Alternatively or in addition, the anomaly detection system can be configured to provide database function support for sums (Sum), averaging (Avg), counts (Count), minimum (Min), and maximum (Max). Alternatively or in addition, the anomaly detection system can be configured to provide support for data definition languages (DDLs), for example to support or process tables, views, indexes/keys, etc. Alternatively or in addition, the anomaly detection system can be configured to provide support for complex databases (e.g., Character Large OBject (CLOB), Binary Large OBject (BLOB), etc.).

In some embodiments, an anomaly detection system is configured such that a user (e.g., an administrator) can define or create new functions, alter existing/stored functions, and/or delete ("drop") functions.

In some embodiments, an anomaly detection system is configured to cause display of a visual "dashboard" via a GUI thereof. The dashboard can be implemented, for example, using a visualization framework such as Elasticsearch or Kibana.

Figure 3:
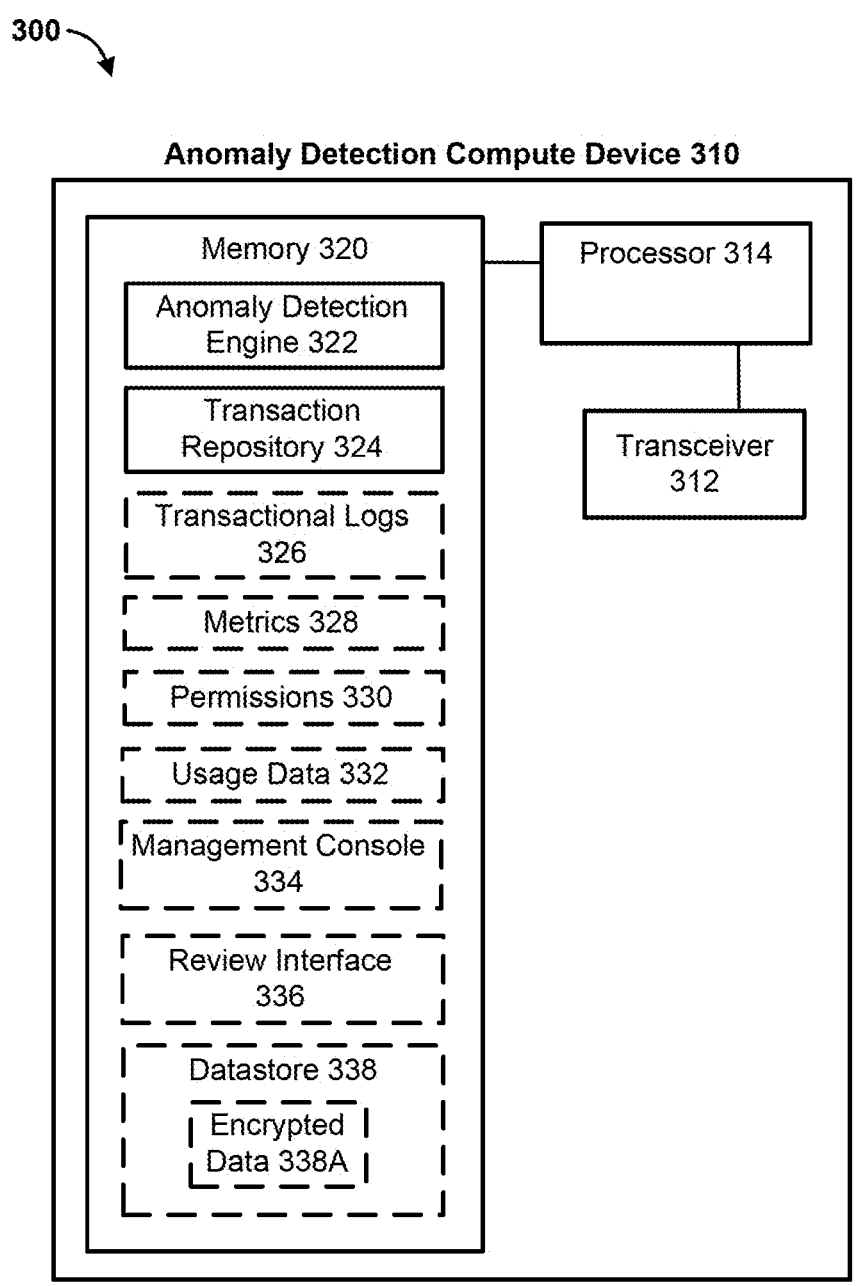
FIG. 3 shows an example anomaly detection compute device, according to some embodiments.

FIG. 3 shows an example anomaly detection compute device, according to some embodiments. As shown in FIG. 3, the anomaly detection compute device 310 includes a processor 314 operably coupled to and in communication with a memory 320 and a transceiver 312. The memory 320 includes an anomaly detection engine 322 (e.g., implemented in software), a transaction repository 324 (e.g., implemented as a table or database), and optionally one or more of: transactional logs 326, metrics 328, permissions 330 (e.g., specifying what actions a given user may or may not take with respect to data accessible by the anomaly detection compute device 310), usage data 332, a management console 334, a review interface 336, or a datastore 338 (e.g., including/storing encrypted data 338A). Alternatively or in addition to being included in the anomaly detection compute device 310, the datastore can be located remote from the anomaly detection compute device 310, in which case the data of the remote datastore 338 may be accessible by the anomaly detection compute device 310 via the transceiver 312 and a communications network (not shown).

Figure 4:
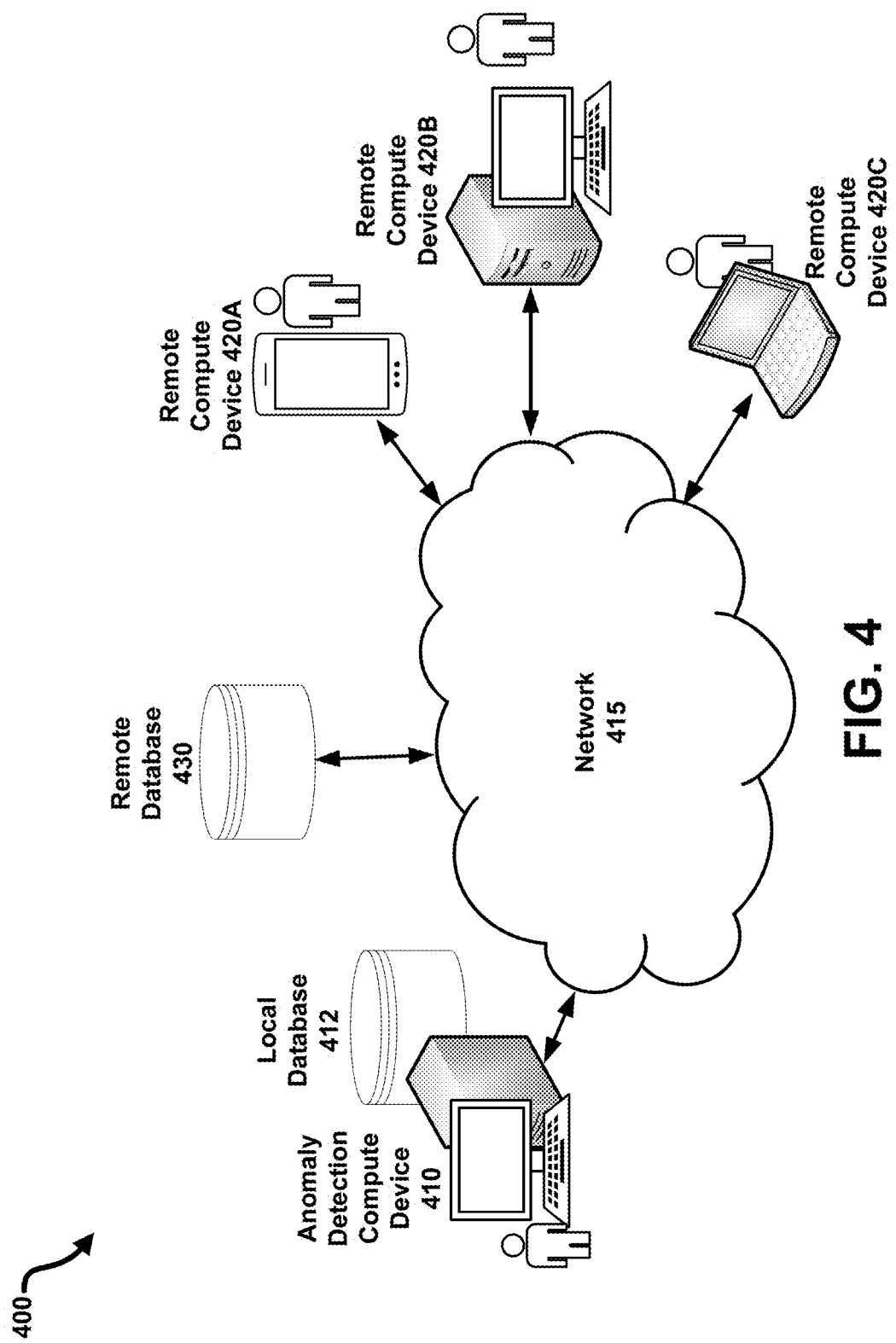
FIG. 4 shows an example networked anomaly detection system, according to some embodiments.

FIG. 4 shows an example networked anomaly detection system 400, according to some embodiments. As shown in FIG. 4, the anomaly detection system 400 includes an anomaly detection compute device 410 (e.g., similar to the anomaly detection compute device 310 of FIG. 3) with a local database 412. The anomaly detection compute device 410 can communicate with a remote database 430 and with multiple different remote compute devices (e.g., mobile device/smartphone 420A, desktop computer 420B, and laptop 420C) via a wired or wireless network 415, each of the mobile device/smartphone 420A, desktop computer 420B, and laptop 420C having one or more associated users/requestors.

Figure 5:
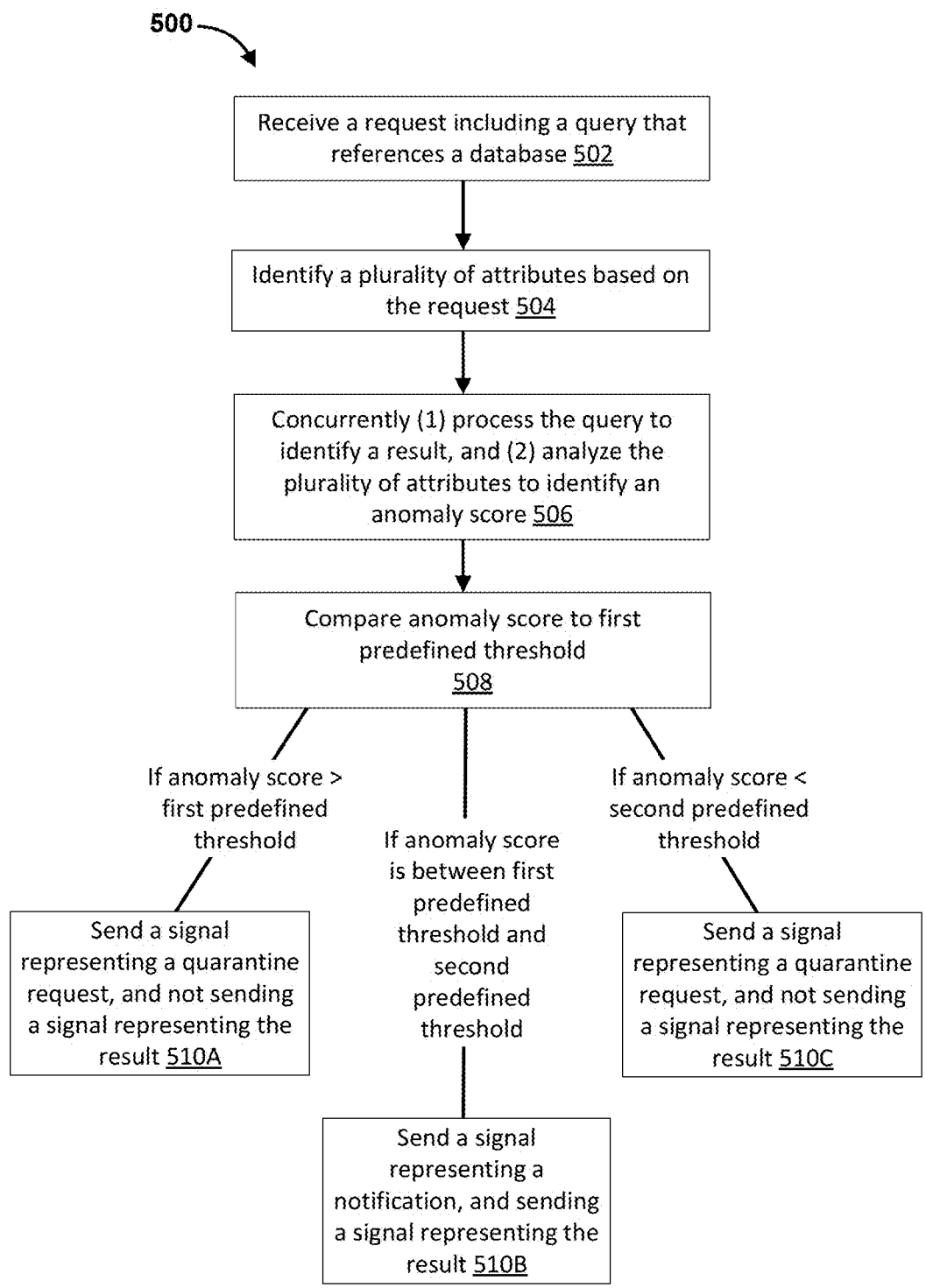
FIG. 5 is a flow diagram of an anomaly detection method, according to some embodiments.

As shown in FIG. 5, an anomaly detection method 500 includes receiving, at 502 and via a processor, a request including a query (e.g., a range query) that references a database (e.g., an encrypted database). A plurality of attributes is identified, at 504, based on the request. At 506, the processor concurrently processes the query to identify a result, and analyzes the plurality of attributes to identify an anomaly score. The anomaly score is compared to a first predefined threshold at 508. When the anomaly score exceeds the first predefined threshold, a signal representing a quarantine request is sent, and a signal representing the result is not sent (510A). When the anomaly score is between the first predefined threshold and a second predefined threshold, a signal representing a notification and a signal representing the result are sent (510B). When the anomaly score is below the second predefined threshold, a signal representing a quarantine request is sent, and a signal representing the result is not sent (510C).

In some implementations, the analyzing the plurality of attributes is performed using self-supervised machine learning.

In some implementations, the anomaly score is determined based on a plurality of locality-sensitive hash functions.

In some implementations, the anomaly score is identified within between about 25 milliseconds (ms) and about 50 ms of receiving the request.

In some implementations, the anomaly score is identified substantially in real time relative to receiving the request.

In some implementations, the analyzing the plurality of attributes is performed without reference to an allow-list or a deny-list.

In some implementations, the plurality of attributes (or metrics) includes at least one of: a user identifier, a source application (e.g., a web page or an API that issued the call), a timestamp, an internet protocol (IP) address, a geographic location, a target object, a query type, an amount of data being requested, a command type (e.g., is it a new SQL that is being issued?), a number of queries including the query and within a predefined time period, or a number of queries or requests associated with a predefined time period. An encryption of the encrypted database can include one of a deterministic encryption, an order-preserving encryption, or a numeric encryption.

In some embodiments, a non-transitory, processor-readable medium stores processor executable instructions to receive a request (e.g., range query) including a representation of a database query transaction for an encrypted database, and to identify a plurality of attributes based on the request. The processor-readable medium also stores processor executable instructions to process the query, during a first time period, to identify a result, and to analyze the plurality of attributes during the first time period, using a machine learning algorithm (e.g., a self-learning machine learning algorithm), to identify an anomaly score. The processor-readable medium also stores processor executable instructions to send a signal representing a quarantine request, without sending a signal representing the result, during a second time period subsequent to the first time period, and in response to the anomaly score exceeding a first predefined threshold. The processor-readable medium also stores processor executable instructions to send a signal representing a notification and send a signal representing the result during the second time period, in response to the anomaly score being between the first predefined threshold and a second predefined threshold. The processor-readable medium also stores processor executable instructions to send a signal representing a quarantine request, without sending a signal representing the result during the second time period, in response to the anomaly score being below the second predefined threshold.

In some implementations, the instructions to analyze the plurality of attributes include instructions to analyze the plurality of attributes based on a weighted score.

In some implementations, the instructions to analyze the plurality of attributes include instructions to analyze the plurality of attributes without applying a filter.

In some implementations, the instructions to analyze the plurality of attributes include instructions to analyze the plurality of attributes without referencing any predefined rule.

In some implementations, the anomaly score is determined based on a plurality of locality-sensitive hash functions.

In some implementations, the instructions to analyze the plurality of attributes include instructions to analyze the plurality of attributes without referencing an allow-list or a deny-list.

In some implementations, an encryption of the encrypted database includes one of a deterministic encryption, an order-preserving encryption, or a numeric encryption.

In some implementations, the non-transitory, processor-readable medium also stores processor executable instructions to log the request without logging the result.

Computation of Anomaly Scores

In some embodiments, a streaming multi-aspect data anomaly detection framework, is used to detect unusual group anomalies as they occur, in a dynamic manner. The multi-aspect data anomaly detection framework can detect anomalies in multi-aspect data including both categorical and numeric attributes, and can be performed "online," in that it processes each record in constant time and constant memory. Moreover, the multi-aspect data anomaly detection framework can capture the correlation between multiple aspects of the data.

In some embodiments, multi-aspect data anomaly detection includes detecting group anomalies, such as the sudden appearance of large amounts of suspiciously similar activity.

The multi-aspect data anomaly detection can account for similarity both in terms of categorical variables (e.g., a small group of repeated IP addresses creating a large number of connections), as well as in numerical variables (e.g., numerically similar values for average packet size).

Each multi-aspect data anomaly detection event and/or update to the multi-aspect data anomaly system can be performed in constant memory (i.e., the memory size is fixed) and constant time (i.e., the time to update is constant), both with respect to the stream length as well as in the number of attribute values for each attribute, unlike known approaches in which memory usage grows in the number of possible attribute values. In some implementations, locality-sensitive hash functions (LSHs) are used to process data in a streaming manner while allowing connections which form group anomalies to be jointly detected, as they consist of similar attribute values and hence are mapped into similar buckets by the hash functions. Alternatively or in addition, in some implementations, Principal Component Analysis (PCA) methods, Information Bottleneck (TB) methods, and/or Autoencoders (AE) are used to first map original features/attributed into a lower-dimensional space, before executing the multi-aspect data anomaly detection in the lower-dimensional space. Example code for performing multi-aspect data anomaly detection can be found at https://github.com/Stream-AD/MStream, the contents of which are incorporated by reference herein in their entirety.

In some embodiments, a stream of records at a multi-aspect data anomaly detection system in a streaming manner. Each record from the stream of records includes a set or plurality of attributes or dimensions, in which each dimension can either be categorical (e.g., an IP address) or real-valued (e.g., average packet length). The multi-aspect data anomaly detection can detect group anomalies based on the stream of records. Group anomalies can have one or more of the following properties: Similarity in Categorical Attributes (e.g., for categorical attributes, group anomalies can include a relatively small number of attribute values, repeated a suspiciously large number of times), Similarity in Real-Valued Attributes (e.g., for real-valued attributes, group anomalies can include clusters of numerically similar attribute values), and Temporally Sudden (e.g., the group anomalies may arrive suddenly, over a suspiciously short amount of time. In addition, their behavior (in terms of attribute values) may differ from what has previously been observed in the stream of records).

Additional details about MStream can be found in "MStream: Fast Anomaly Detection in Multi-Aspect Streams," by S. Bhatia, et al., WWW '21: Proceedings of the Web Conference (Apr. 19, 2021), the entire contents of which are hereby incorporated by reference in their entirety.

In some embodiments, an anomaly detection system is configured to perform application-level encryption, whereby data is encrypted within the application itself as the data is generated or processed, and before the data is committed and stored at the database level. Application-level encryption creates a secure perimeter around data, potentially both when the data is at rest and when the data is in motion. Application-level encryption can be built into an application, or implemented as a security level (e.g., using a third-party agent). Anomaly detection systems and methods set forth herein are compatible with, and can include, data encryption and the ability to perform application-agnostic querying of the encrypted data. Examples of such data encryption and application-agnostic querying of the same can be found in U.S. patent application Ser. No. 17/191,177, filed Mar. 3, 2021 and titled "System and Methods for Data Encryption and Application-Agnostic Querying of Encrypted Data," the entire contents of which are hereby incorporated by reference in their entirety.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

While various embodiments have been described above, it should be understood that they have been presented by way of example only, and not limitation. Where methods and/or schematics described above indicate certain events and/or flow patterns occurring in certain order, the ordering of certain events and/or flow patterns may be modified. While the embodiments have been particularly shown and described, it will be understood that various changes in form and details may be made. Additionally, certain of the steps may be performed concurrently in a parallel process when possible, as well as performed sequentially as described above. Although various embodiments have been described as having particular features and/or combinations of components, other embodiments are possible having any combination or sub-combination of any features and/or components from any of the embodiments described herein. Furthermore, although various embodiments are described as having a particular entity associated with a particular compute device, in other embodiments different entities can be associated with other and/or different compute devices.

It is intended that the systems and methods described herein can be performed by software (stored in memory and/or executed on hardware), hardware, or a combination thereof. Hardware modules may include, for example, a general-purpose processor, a field programmable gates array (FPGA), and/or an application specific integrated circuit (ASIC). Software modules (executed on hardware) can be expressed in a variety of software languages (e.g., computer code), including Unix utilities, C, C++, Java™, JavaScript, Ruby, SQL, SAS®, Python, Fortran, the R programming language/software environment, Visual Basic™, and other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. Additional examples of computer code include, but are not limited to, control signals, encrypted code, and compressed code. Each of the devices described herein can include one or more processors as described above.

Some embodiments described herein relate to devices with a non-transitory computer-readable medium (also can be referred to as a non-transitory processor-readable medium or memory) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, and solid state storage devices; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Processor-executable instructions can be in many forms, such as program modules, executed by one or more compute devices, and can include routines, programs, objects, components, data structures, and other suitable code that causes a processor to perform particular tasks or implement particular data types, and the functionality can be combined and/or distributed as appropriate for various embodiments.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements), etc.

The invention claimed is:

1. A method for detecting malicious database access, the method comprising:
   receiving, at a processor, a request including a database query that references a database;
   identifying, via the processor, a plurality of attributes associated with the database query;
   concurrently (1) processing the database query, during a first time period, to identify a result, and (2) analyzing the identified plurality of attributes during the first time period, using a self-learning machine learning algorithm, to identify an aggregate anomaly score for anomaly detection based on a plurality of different predefined thresholds;
   in response to the aggregate anomaly score exceeding a first predefined threshold from the plurality of different predefined thresholds and during a second time period subsequent to the first time period:
      sending a signal, via the processor, representing a quarantine request, and
      not sending a signal representing the result,
   in response to the aggregate anomaly score being between the first predefined threshold and a second predefined threshold from the plurality of different predefined thresholds during the second time period:
      sending a signal, via the processor, representing a notification, and
      sending a signal representing the result, and
   in response to the aggregate anomaly score being below the second predefined threshold during the second time period:
      sending a signal, via the processor, representing a quarantine request, and
      not sending a signal representing the result.

2. The method of claim 1, wherein the aggregate anomaly score is determined based on a plurality of locality-sensitive hash functions.

3. The method of claim 1, wherein the aggregate anomaly score is identified within between about 25 milliseconds (ms) and about 50 ms of receiving the request.

4. The method of claim 1, wherein the aggregate anomaly score is identified substantially in real time relative to receiving the request.

5. The method of claim 1, wherein the analyzing the plurality of attributes is performed without reference to an allow-list or a deny-list.

6. The method of claim 1, wherein the plurality of attributes includes at least one of: a user identifier, a source application, a timestamp, an internet protocol (IP) address, a geographic location, a target object, a query type, an amount of data being requested, a command type, or a number of queries including the database query and within a predefined time period.

7. The method of claim 1, wherein the database query is a range query.

8. The method of claim 1, wherein the database is an encrypted database.

9. The method of claim 8, wherein an encryption of the encrypted database includes one of a deterministic encryption, an order-preserving encryption, or a numeric encryption.

10. A non-transitory, processor-readable storage medium storing processor device executable instructions for detecting malicious database access, the processor device executable instructions including instructions to:
   receive a request including a representation of a database query transaction for an encrypted database;
   identify a plurality of attributes associated with the database query;
   process the database query, during a first time period, to identify a result;
   analyze concurrently the identified plurality of attributes during the first time period, using a self-learning machine learning algorithm, to identify an aggregate anomaly score for anomaly detection based on a plurality of different predefined thresholds;
   during a second time period subsequent to the first time period, and in response to the aggregate anomaly score exceeding a first predefined threshold from the plurality of different predefined thresholds:
      send a signal representing a quarantine request, without sending a signal representing the result,
   during the second time period, and in response to the aggregate anomaly score being between the first predefined threshold and a second predefined threshold from the plurality of different predefined thresholds:
      send a signal representing a notification, and
      send a signal representing the result, and during the second time period, and in response to the aggregate anomaly score being below the second predefined threshold:

send a signal representing a quarantine request, without sending a signal representing the result.

11. The non-transitory, processor-readable medium of claim 10, wherein the instructions to analyze the plurality of attributes include instructions to analyze the plurality of attributes based on a weighted score.

12. The non-transitory, processor-readable medium of claim 10, wherein the instructions to analyze the plurality of attributes include instructions to analyze the plurality of attributes without applying a filter.

13. The non-transitory, processor-readable medium of claim 10, wherein the instructions to analyze the plurality of attributes include instructions to analyze the plurality of attributes without referencing any predefined rule.

14. The non-transitory, processor-readable medium of claim 10, wherein the aggregate anomaly score is determined based on a plurality of locality-sensitive hash functions.

15. The non-transitory, processor-readable medium of claim 10, wherein the instructions to analyze the plurality of attributes include instructions to analyze the plurality of attributes without referencing an allow-list or a deny-list.

16. The non-transitory, processor-readable medium of claim 10, wherein an encryption of the encrypted database includes one of a deterministic encryption, an order-preserving encryption, or a numeric encryption.

17. The non-transitory, processor-readable medium of claim 10, wherein the request includes a range query.

18. The non-transitory, processor-readable medium of claim 10, further storing processor device executable instructions to log the request without logging the result.

* * * * *